UNITED STATES PATENT OFFICE.

JOHANNES MEYENBERG, OF BAAR, NEAR ZUG, SWITZERLAND.

PROCESS FOR THE PRODUCTION OF AN INSULATING MATERIAL FOR ELECTRICAL PURPOSES.

No. 848,117. Specification of Letters Patent. Patented March 26, 1907.

Application filed December 4, 1905. Serial No. 290,298.

*To all whom it may concern:*

Be it known that I, JOHANNES MEYENBERG, a citizen of the Republic of Switzerland, residing at Baar, near Zug, in Switzerland, have invented a new and useful Improved Process for the Production of an Insulating Material for Electrical Purposes, of which the following is a specification.

The present invention relates to an insulating material and the process of making the same, said material being especially adapted for electrical insulation, both for high and low tension.

Animal filaments—such as hair, wool, sponge cuttings, silk, and the like—are reduced to small pieces, piled in heaps, moistened, and fermentation allowed to set in. The heat developed by the fermentation should not exceed about 20° Celsius. The fermented mass is then treated with a solution of an alkaline lye and stirred until homogeneous and then treated with a coagulant, as a suitable sulfate—as alum, aluminium sulfate, calcium sulfate, &c.—or with a solution of an acid salt or chromium, whereby the natural cement of the substances, such as gelatin, is dissolved out and a flocculent precipitate is formed The liquid with the neutralized remaining free alkali is then decanted or pressed off from the remaining mass, and the filaments or fibers and natural cements are again mechanically combined. For the intimate mechanical uniting it is found advisable to use a centrifugal machine. By the precipitation the homogenity of the finished product is considerably increased and its tendency to absorb moisture considerably decreased.

Another mass is now prepared which is intended to increase the insulating capacity of the above-described preparation. This mass consists, principally, of ozocerite. As this mineral resin has a low melting-point, it must be mixed with suitable vegetable insulating-resins that will give it the necessary firmness by raising the melting-point. For this reason there is added to twenty-five per cent. ozocerite sixty-two and one-half per cent. carnauba-wax, 6.25 per cent. colophony, and 6.25 per cent. of linseed-oil or almond-oil. This resin composition is mixed either as a solid in a pulverulent form with the product obtained by treating the filaments or the latter is impregnated with the hot melted resin composition, thereby increasing the insulating properties and at the same time rendering the mixture capable of being worked up into shape for use. The mass thus obtained is pressed into plates or other desired shapes at the usual atmospheric temperature and then subjected to a pressure of from one hunderd to six hundred tons per square meter at a heat of at least 80° Celsius for better distributing the intermingled ingredients, which operation may be advantageously effected by means of heated plates. In order to protect the product obtained against combustion and to make it moisture-proof, it is soaked with a silicate solution, to which is added carbohydrate compounds, such as casein, dextrin, and the like.

The fibrous material may be impregnated with the resin compound after being molded, if so desired, and the fact that it will combine and be absorbed mostly by the surface of the molded article is not prejudicial because by reason of the subsequent pressure and heat the homogenity of the mass is promoted.

I claim—

1. The process of producing insulating material which comprises subjecting animal filaments to fermentation, then treating with an alkaline lye, precipitating the natural cements by a coagulant, removing resultant liquid therefrom, then mixing the residue and finally shaping the same.

2. The process of producing insulating material which comprises subjecting animal filaments to fermentation, mixing the fermented mass with an alkaline lye, treating the resultant mixture with a solution of a suitable sulfate to precipitate the natural cements, removing the resulting liquid from the mass, mixing the residue and molding the same under pressure.

3. The process of producing insulating material which comprises subjecting animal hair to fermentation and thereby generating heat, treating the heated fermented mass with an alkaline lye, mixing therewith sulfate of aluminium, removing the resulting liquid and adding to the same ozocerite mixed with a substance capable of raising the melting-point of the mixture and molding the resultant mixture and then pressing the same while heating them.

4. The process of producing insulating material which comprises subjecting animal hair and sponge cuttings to fermentation, treating the material with an alkaline lye, mixing therewith a coagulant, removing the liquid therefrom, mixing the residue with a resin mixture, molding the same, then compressing the molded mass at a temperature above normal, and treating the compressed mass with a fireproofing composition.

5. The process of producing insulating material comprising subjecting hair, sponge, silk or other animal filaments to fermentation, treating the fermented mass with an alkaline lye, mixing therewith a coagulant to precipitate the natural cements, pressing out the liquid and mixing the residue, adding thereto ozocerite mixed with a hardening vegetable resin, forming and compressing the formed mass at a temperature above normal and impregnating the product with a silicate solution mixed with a carbohydrate.

6. An insulating material comprising fermented animal fibers mixed with their coagulated natural cements, a resin mixture, and a fireproofing silicate.

In testimony whereof I have signed my name to this specification in the presence of two subscribing witnesses.

JOHANNES MEYENBERG.

Witnesses:
A. LIEBERKNECHT,
E. BLUM.